United States Patent
Anderson et al.

(10) Patent No.: US 8,788,866 B2
(45) Date of Patent: Jul. 22, 2014

(54) METHOD AND SYSTEM FOR REDUCING THERMAL LOAD BY MONITORING AND CONTROLLING CURRENT FLOW IN A PORTABLE COMPUTING DEVICE

(75) Inventors: Jon James Anderson, Boulder, CO (US); Gary D. Good, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 13/197,238

(22) Filed: Aug. 3, 2011

(65) Prior Publication Data

US 2012/0272086 A1    Oct. 25, 2012

Related U.S. Application Data

(60) Provisional application No. 61/478,653, filed on Apr. 25, 2011.

(51) Int. Cl.
G06F 1/28 (2006.01)
G06F 1/20 (2006.01)
G06F 11/30 (2006.01)
G06F 1/32 (2006.01)

(52) U.S. Cl.
CPC ............ *G06F 1/206* (2013.01); *G06F 11/3058* (2013.01); *G06F 1/28* (2013.01); *Y02B 60/1285* (2013.01); *G06F 1/324* (2013.01); *G06F 1/3287* (2013.01); *G06F 1/3296* (2013.01); Y02B 60/1275 (2013.01)
USPC ................. 713/340; 713/300; 702/64; 363/74

(58) Field of Classification Search
CPC ............................. G06F 1/206; G06F 11/3058
USPC .................. 713/300, 340; 363/50, 74; 702/64
See application file for complete search history.

(56) References Cited

U.S. PATENT DOCUMENTS

| | | | |
|---|---|---|---|
| 6,614,668 B2 * | 9/2003 | Coffey et al. | .................... 363/39 |
| 7,120,808 B2 | 10/2006 | Miyairi et al. | |
| 7,395,445 B1 * | 7/2008 | Ramsay et al. | ............... 713/340 |
| 7,451,332 B2 | 11/2008 | Culbert et al. | |
| 2005/0194933 A1 | 9/2005 | Arnold et al. | |
| 2005/0210905 A1 | 9/2005 | Burns et al. | |
| 2006/0218423 A1 | 9/2006 | Diefenbaugh et al. | |
| 2006/0238416 A1 * | 10/2006 | Voor et al. | ................ 342/357.06 |
| 2007/0094521 A1 | 4/2007 | Brooks et al. | |
| 2009/0322150 A1 | 12/2009 | Cline et al. | |
| 2010/0330950 A1 | 12/2010 | Wells et al. | |

OTHER PUBLICATIONS

International Search Report and Written Opinion—PCT/US2012/033340—ISA/EPO—Jun. 27, 2012.

* cited by examiner

*Primary Examiner* — Thuan Du
(74) *Attorney, Agent, or Firm* — Nicholas A. Cole

(57) ABSTRACT

A method and system for reducing thermal load by monitoring and controlling current flow in a portable computing device ("PCD") are disclosed. The method includes monitoring a temperature of the PCD and determining if the temperature has reached a temperature threshold condition. This temperature threshold condition may be comprised within any one or more of a plurality of thermal policy states, in which each thermal policy state may dictate various thermal mitigation techniques. The thermal policy states may be associated with values that may indicate thermal loading of a PCD. If the temperature has reached the first threshold condition, then electrical current exiting a power supply device may be monitored. If it is determined that the electrical current has exceeded a current threshold condition, such as a maximum current, a hardware device corresponding to the electrical current may be selected for application of a thermal mitigation technique.

40 Claims, 12 Drawing Sheets

800

NORMAL STATE —305

- NORMAL MONITORING/POLLING/INTERRUPTS FROM THERMAL SENSORS
- NO THERMAL MITIGATION TECHNIQUE(S) APPLIED

QUALITY OF SERVICE (QoS) STATE —310

- MORE RAPID MONITORING/POLLING/INTERRUPTS FROM THERMAL SENSORS
- START APPLYING THERMAL MITIGATION TECHNIQUE(S) BUT WITH OBJECTIVE TO MAINTAIN HIGHEST PERFORMANCE AND LITTLE OR NO PERCEPTION IN QUALITY OF SERVICE TO OPERATOR OF DEVICE

SEVERE STATE —315

- CONTINUOUS MONITORING/POLLING/INTERRUPTS FROM THERMAL SENSORS
- APPLY MORE AGGRESSIVE THERMAL MITIGATION TECHNIQUE(S) AND/OR ADDITIONAL THERMAL MITIGATION TECHNIQUES WITH PROBABLE PERCEIVABLE DEGRADATION OF PERFORMANCE BY OPERATOR OF DEVICE
- REDUCE POWER TO DEVICES (AMPLIFIERS, PROCESSORS)
- SHIFT WORKLOADS IN A SPATIAL MANNER
- ADJUST PARAMETERS OF WORKLOAD ALGORITHMS (DVFS, ETC)

CRITICAL STATE —320

- SHUT DOWN NON-ESSENTIAL DEVICES!!
- MAINTAIN ONLY E911 AND GPS FUNCTIONS

METHOD AND SYSTEM FOR REDUCING THERMAL LOAD BY MONITORING AND CONTROLLING CURRENT FLOW IN A PORTABLE COMPUTING DEVICE

PRIORITY AND RELATED APPLICATIONS

This patent application claims priority under 35 U.S.C. §119(e) to U.S. Provisional Patent Application Ser. No. 61/478,653 filed on Apr. 25, 2011, entitled, "METHOD AND SYSTEM FOR REDUCING THERMAL LOAD BY MONITORING AND CONTROLLING CURRENT FLOW IN A PORTABLE COMPUTING DEVICE," the entire contents of which are hereby incorporated by reference.

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic devices.

One unique aspect of PCDs is that they typically do not have active cooling devices, like fans, which are often found in larger computing devices like laptop and desk top computers. Instead of using fans, PCDs may rely on the spatial arrangement of electronic packaging so that two or more active and heat producing devices are not positioned in close proximity to one another. When two or more heat producing devices are not placed in close proximity to one another, then usually their operation does not negatively impact each other and any other electronics that may surround them. Many PCDs may also rely on passive cooling devices such as heat sinks to manage thermal energy among the electronics forming a respective PCD.

However, the spatial arrangement of electronic packaging and passive cooling devices, like heatsinks, are sometimes not adequate enough to prevent a PCD from reaching critical temperatures. Such critical thermal temperatures may cause permanent damage to the electronics within a respective PCD. Currently, when a PCD approaches a critical temperature, the operating system is designed to shut down most of the electronics generating the thermal energy in order to cool the PCD. While shutting down electronics may be effective to avoid critical temperatures that may cause permanent damage, such drastic measures directly impact performance of the PCD and may render a PCD useless with respect to its functionality when such measures are taken.

Further, as noted above, the electronic packaging of a PCD usually requires that numerous active and heat producing components be contained in a very small volume. As such, accurate identification of the source or source(s) of extreme thermal loads or conditions within a PCD may be challenging. In an effort to detect thermal load sources, a temperature sensor is often positioned proximate to certain hardware devices that are suspected to produce excessive heat. However, due to other proximate heat producing components, a reading from a temperature sensor may not be entirely probative of which particular hardware device is the primary source of any excessive heat generation.

Accordingly, what is needed in the art is a method and system for reducing thermal loads of a PCD irrespective of the source or sources of the thermal loads.

SUMMARY OF THE DISCLOSURE

A method and system for reducing thermal load by monitoring and controlling current flow in a portable computing device are disclosed. The method includes monitoring a temperature of the portable computing device and determining if the temperature has reached a temperature threshold condition. This temperature threshold condition may be comprise any one of a plurality of thermal policy states, in which each thermal policy state may dictate or require any combination of various thermal mitigation techniques. The thermal policy states may be associated with temperature ranges or other values that may indicate thermal loading of a portable computing device. If the temperature threshold condition is detected, then electrical current exiting a power supply device may be monitored. If it is determined that the electrical current has exceeded a current threshold condition, such as a maximum current, a hardware device corresponding to the electrical current may be selected or ear-marked for application of a thermal mitigation technique.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 7 is a diagram illustrating exemplary thermal mitigation techniques that may be applied or ordered by the thermal policy manager;

DETAILED DESCRIPTION

Figure 1:
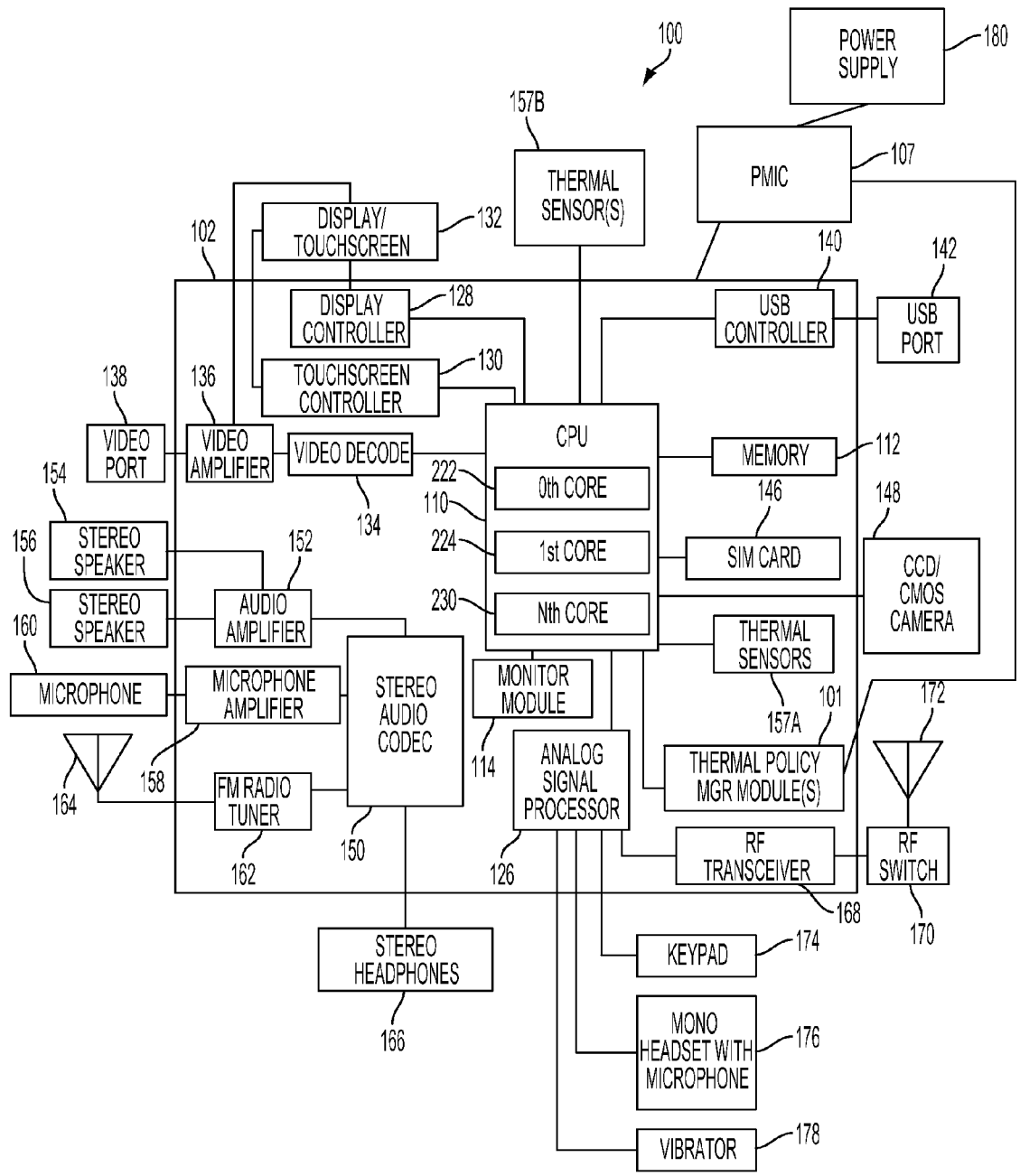
FIG. 1 is a functional block diagram illustrating an embodiment of a portable computing device (PCD)

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

FIG. 1: Thermal Policy Management Elements of PCD 100

Referring to FIG. 1, this figure is a functional block diagram of an exemplary, non-limiting aspect of a PCD 100 in the form of a wireless telephone for implementing methods and systems for monitoring thermal conditions and managing thermal policies. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Instead of a CPU 110, a digital signal processor ("DSP") may also be employed as understood by one of ordinary skill in the art.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop (and/or a current) that is converted to digital signals with an analog-to-digital converter ("ADC") controller 103 (See FIG. 2A). However, other types of thermal sensors 157 may be employed without departing from the scope of the invention.

The thermal sensors 157, in addition to being controlled and monitored by an ADC controller 103, may also be controlled and monitored by one or more thermal policy manager module(s) 101. The thermal policy manager module(s) 101 may comprise software which is executed by the CPU 110. However, the thermal policy manager module(s) 101 may also be formed from hardware and/or firmware without departing from the scope of the invention.

The thermal policy manager module(s) 101 may be coupled to a power management integrated circuit ("PMIC") 107. The PMIC 107 may be responsible for distributing power to the various hardware components present on the chip 102. The thermal policy manager module 101 may monitor and control aspects of the PMIC 107.

In general, the thermal policy manager module(s) 101 may be responsible for monitoring and controlling current flow from the PMIC 107 as well as applying thermal policies that include one or more thermal mitigation techniques. Such thermal mitigation techniques may help the PCD 100 manage thermal conditions and/or thermal loads and avoid experiencing adverse thermal conditions, such as, for example, reaching critical temperatures while maintaining a high level of functionality.

FIG. 1 also shows that the PCD 100 may include a monitor module 114. The monitor module 114 communicates with multiple operational sensors (e.g., thermal sensors 157) distributed throughout the on-chip system 102 and with the CPU 110 of the PCD 100 as well as with the thermal policy manager module 101. Specifically, the monitor module 114 may provide one or more indicators of events, processes, applications, resource status conditions, elapsed time, temperature, etc. in response to control signals originating from the thermal policy manager module 101. The thermal policy manager module 101 may work with the monitor module 114 to identify adverse thermal conditions and apply thermal policies that include one or more thermal mitigation techniques, as will be described in further detail below.

In a particular aspect, one or more of the method steps described herein may be implemented by executable instructions and parameters, stored in the memory 112, that form the one or more thermal policy manager module(s) 101. These instructions that form the thermal policy manager module(s) may be executed by the CPU 110, the analog signal processor 126, or any other processor, in addition to the ADC controller 103 to perform the methods described herein. Further, the processors, 110, 126, the memory 112, the instructions stored therein, or a combination thereof may serve as a means for performing one or more of the method steps described herein.

FIG. 1: Other Elements of PCD 100

As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 is a schematic diagram illustrating an embodiment of a portable computing device (PCD) that includes a video decoder 134. The video decoder 134 is coupled to the multi-core central processing unit ("CPU") 110. A video amplifier 136 is coupled to the video decoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102. The monitor module 114 may receive one or more indications or signals from one or more of these external devices by way of the analog signal processor 126 and the CPU 110 to aid in the real time management of the resources operable on the PCD 100.

Figure 2A:
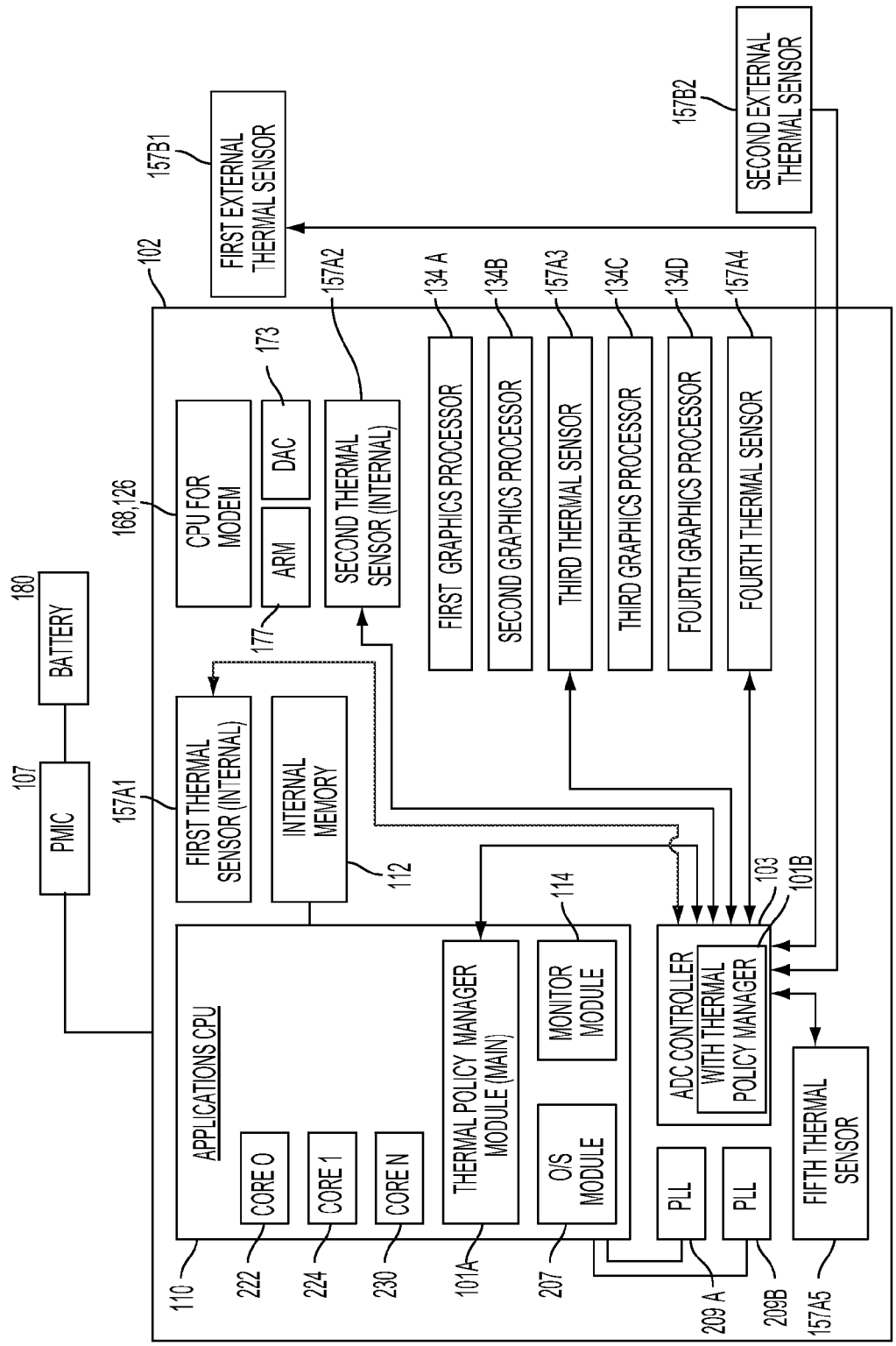
FIG. 2A is a functional block diagram illustrating an exemplary spatial arrangement of hardware for a chip illustrated in FIG. 1.

FIG. 2A is a functional block diagram illustrating an exemplary spatial arrangement of hardware for the chip 102 illustrated in FIG. 1. According to this exemplary embodiment, the applications CPU 110 is positioned on the far left side region of the chip 102 while the modem CPU 168/126 is positioned on a far right side region of the chip 102. The applications CPU 110 may comprise a multicore processor that includes a zeroth core 222, a first core 224, and an Nth core 230.

The applications CPU 110 may be executing a thermal policy manager module 101A (when embodied in software) or it may include a thermal policy manager module 101B (when embodied in hardware and/or firmware). The applications CPU 110 is further illustrated to include operating system ("O/S") module 207 and a monitor module 114.

The applications CPU 110 may be coupled to one or more phase locked loops ("PLLs") 209A, 209B which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager module 101B that works in conjunction with the main thermal policy manager module 101A of the applications CPU 110.

The thermal policy manager module 101B of the ADC controller 103 may be responsible for monitoring and tracking multiple thermal sensors 157 that may be provided "on-chip" 102 and "off-chip" 102. The on-chip or internal thermal sensors 157A may be positioned at various locations to monitor the thermal conditions of the PCD 100.

For example, a first internal thermal sensor 157A1 may be positioned in a top center region of the chip 102 between the applications CPU 110 and the modem CPU 168/126 and adjacent to internal memory 112. A second internal thermal sensor 157A2 may be positioned below the modem CPU 168/126 on a right side region of the chip 102. This second internal thermal sensor 157A2 may also be positioned between a an advanced reduced instruction set computer ("RISC") instruction set machine ("ARM") 177 and a first graphics processor 134A. A digital-to-analog controller ("DAC") 173 may be positioned between the second internal thermal sensor 157A2 and the modem CPU 168/126.

A third internal thermal sensor 157A3 may be positioned between a second graphics processor 134B and a third graphics processor 134C in a far right region of the chip 102. A fourth internal thermal sensor 157A4 may be positioned in a far right region of the chip 102 and beneath a fourth graphics processor 134D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168/126, the ARM 177, and DAC 173. A second external thermal sensor 157B2 may be positioned off-chip and adjacent to a lower right quadrant of the chip 102 that may include the third and fourth graphics processors 134C, 134D.

One of ordinary skill in the art will recognize that various other spatial arrangements of the hardware illustrated in FIG. 2A (or other hardware resources) may be provided without departing from the scope of the invention. FIG. 2A illustrates yet one exemplary spatial arrangement and how the main thermal policy manager module 101A and ADC controller 103 with its thermal policy manager module 101B may manage thermal states that are a function of the exemplary spatial arrangement illustrated in FIG. 2A.

Thermal sensors 157 may be positioned adjacent to hardware, such the CPU 110, and on a same surface with the hardware within the portable computing device 100. For example, see the first internal thermal sensor 157A1. The thermal policy manager module 101A may assign one or more specific thermal mitigation techniques unique to the hardware associated with a particular thermal sensor 157, such as the CPU 110 corresponding to the first internal thermal sensor 157A1. In one exemplary embodiment, the thermal mitigation techniques assigned to the CPU 110 and its corresponding thermal sensor 157A1 may be different compared to the thermal mitigation techniques assigned to the third graphical processor 134C associated with the third thermal sensor 157A3. In other exemplary embodiments, the thermal mitigation techniques applied to hardware may be uniform or the same across the whole portable computing device 100.

Figure 2B:
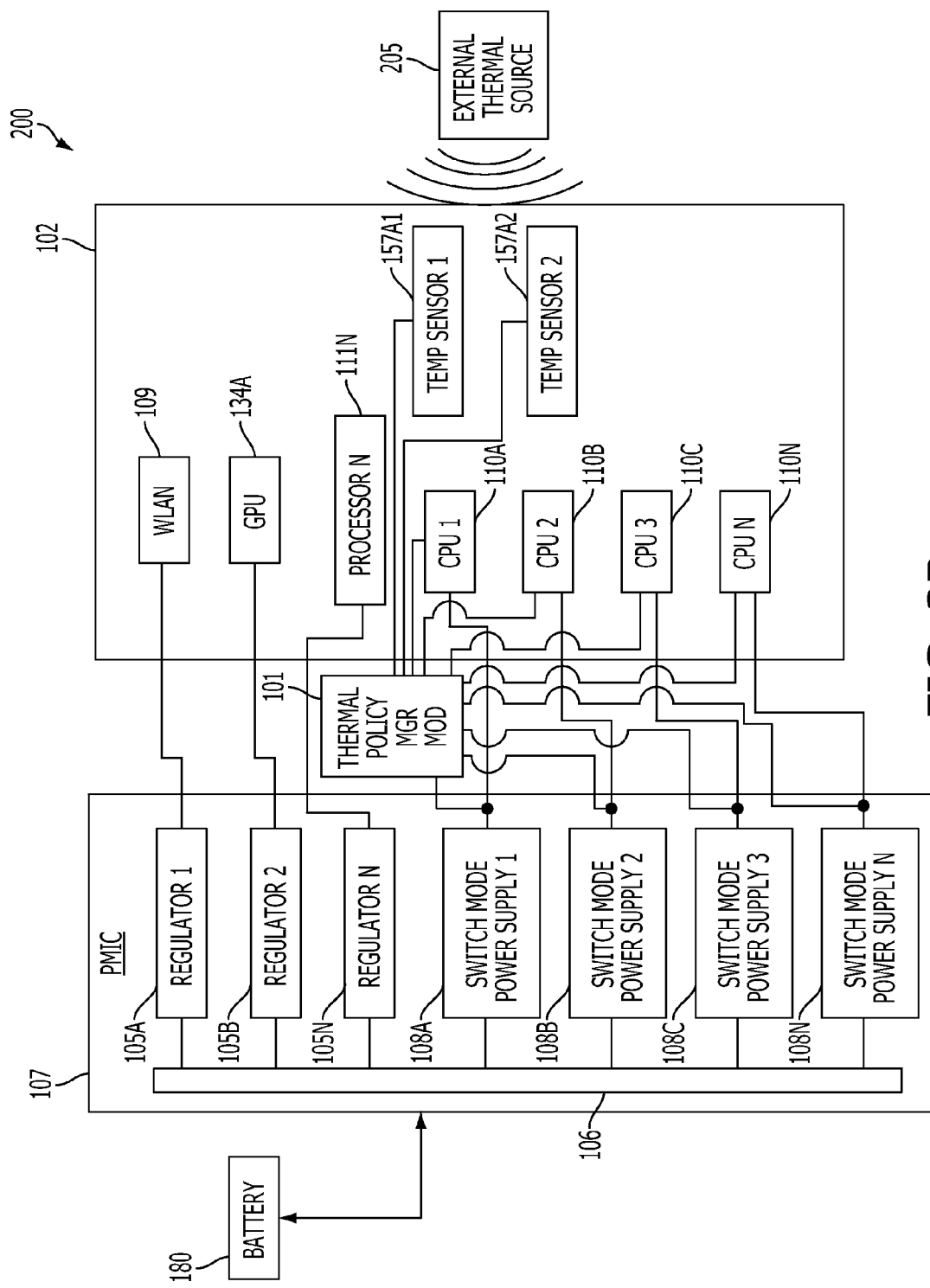
FIG. 2B is a schematic diagram illustrating respective logical connections between a power management integrated circuit ("PMIC") and hardware devices of the chip illustrated in FIG. 2A.

FIG. 2B is a functional block diagram illustrating respective logical connections between a power management integrated circuit ("PMIC") 107 and hardware devices of the chip 102 illustrated in FIG. 2A. This figure is not intended to provide any particular spatial arrangement of the components illustrated compared to FIG. 2A.

FIG. 2B illustrates the main components of a system 200 for mitigating thermal issues within the PCD 100 by monitoring and controlling electrical power distribution among hardware devices on the chip 102. The system 200 may comprise the thermal policy manager module 101, a PMIC 107, and chip 102. Chip 102 generally corresponds to the on-chip system 102 of FIG. 2A.

The PMIC 107 may comprise a first power regulator 105A, a second power regulator 105B, and an Nth power regulator 105N. The PMIC 107 may further comprise a first switch mode power supply module 108A, a second switch mode power supply module 108B, a third switch mode power supply module 108C, and an Nth switch mode power supply module 108N.

The power regulators 105 generally control and gate power from the power rail 106 to one or more hardware devices that consume power at a first magnitude. For example, the first power regulator 105A may control power flow to a wireless local area network ("LAN") circuit 109. The second power regulator 105B may control power to a graphics processor 134A, while the Nth power regulator 105N controls power to an Nth processor 111N. The Nth processor 111N may comprise a digital signal processor ("DSP"), or an analog signal processor ("ASP") as understood by one of ordinary skill in the art. Further, the number of hardware elements for both the PMIC 107 and chip 102 may be varied higher or lower as understood by one of ordinary skill in the art.

As noted previously, each of the power regulators 105 may control power to hardware elements that consume power at a first magnitude. Meanwhile, the switch mode power supply modules 108 may control power to hardware elements that consumer power at a second magnitude, which is generally higher than the first magnitude.

For example, hardware elements receiving current from the power regulators 105 may have a power consumption in the range of about hundreds of milliamps while hardware elements receiving current from the switch mode power supply modules 108 may have a power consumption in the range of about one-hundred milliamps to about one Amp or greater. As another example, CPUs 110 may consume power anywhere from 200 milliamps to over two amps. For elements like the WLAN 109, power consumption may fall in the range between about 50 milliamps to about 200 milliamps. One of ordinary skill in the art recognizes that power consumption may fall outside these exemplary ranges but are still within the scope of this disclosure.

The first switch mode power supply module 108A may control and gate power for a first CPU 110A. The second switch mode power supply module 108B may control and gate power for a second CPU 110B, while the third switch mode power supply module 108C may control and gate power for a third CPU 110C. And an Nth switch mode power supply module 108N may control and gate power for an Nth CPU 110N. While only single core CPUs 110 are illustrated, one of ordinary skill in the art recognizes that anyone or all of the CPUs 110 may be substituted with other hardware devices, such as, but not limited to, cores of a multicore CPU 110, and other types of dedicated processors.

Each switch mode power supply module 108 may be coupled to the thermal policy manager module 101. The thermal policy manager module 101 may monitor and ultimately control the magnitude of the electrical current flowing into a respective CPU 110. The control exerted by the thermal policy manager 101 with respect to the electrical current flowing out of the switch mode power supply module 101 is generally an indirect one. The control aspect of the module 101 may include a thermal mitigation technique as described below, although not limited to the exemplary techniques disclosed in the present specification. For example, the thermal policy manager module 101 may control current into CPUs 110 by adjusting at least one of the following parameters: 1) a selection of the voltage/frequency DCVS table, 2) reducing processing load of a CPU 110, 3) altering the mode of operation of a CPU 110 (i.e. switching between a high performance CPU 110 and a low performance CPU 110, etc.).

The thermal policy manager module 101 may monitor electrical current exiting each switch mode power supply module 108 with one or more current sensors (not illustrated). The thermal policy manager module 101 may issue commands to other elements that impact how each power supply module 108 provides power in order to control an amount of current flow into each respective hardware device coupled to a respective switch mode power supply module 108. Such control by the thermal policy manager module 101 may occur when a thermal mitigation technique is activated by the thermal policy manager module 101.

Internal temperature sensors 157A1, 157A2 are also coupled to the thermal policy manager module 101 similar to those illustrated in FIGS. 1 and 2A described above. The internal temperature sensors 157A1, 157A2 may accurately record the temperature adjacent to hardware devices on the chip 102 that are proximate to a respective sensor 157, such as the first CPU 110A and the second CPU 110B. However, the internal temperature sensors 157A usually cannot discriminate or determine if the hardware devices on the chip 102 are the sole cause or main contributors to any increases in temperature. Often, external thermal sources 205 (relative to the on-chip system 102) unrelated, yet in close physical proximity, to the hardware devices 102 may be a significant or sole cause of a temperature change detected by a respective internal temperature sensor 157A.

One of ordinary skill in the art will recognize that excess thermal energy may be detrimental to a given hardware device present within the on-chip system 102, regardless of whether the thermal energy is generated by the given hardware device, an adjacent hardware device or a device external to the on-chip system 102, all of which may comprise an external heat source 205. Therefore, even if an external thermal source 205 is a main contributor to a temperature increase detected by the internal temperature sensors 157A, the thermal policy manager module 101 may decide to apply thermal mitigation techniques to the hardware devices present within the on-chip system 102. One thermal mitigation technique may include the reduction of electrical current to a particular hardware device on the chip 102. This electrical current reduction may be activated in response to commands issued by the thermal policy manager module 101 in response to the temperature increase detected by the internal temperature sensors 157A. Other thermal mitigation techniques will be described in more detail below in connection with FIGS. 6-7.

Figure 3:
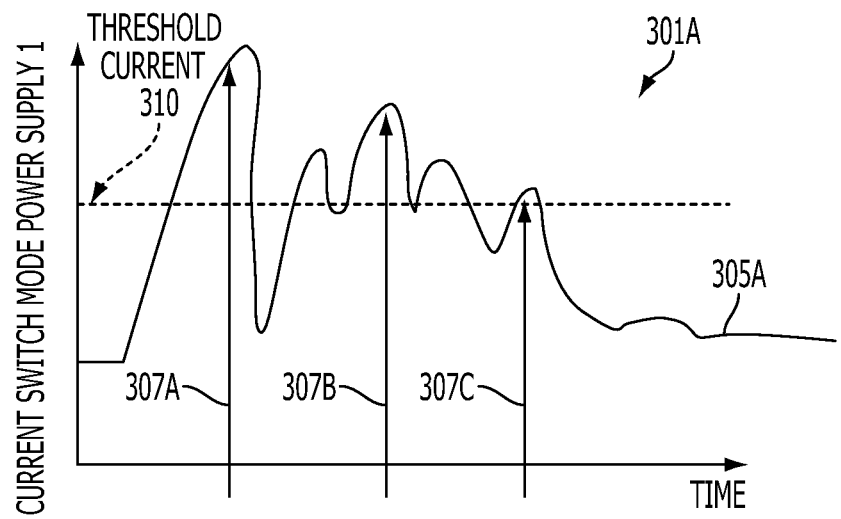
FIG. 3 is graph of an unfiltered signal representing current flowing from a switch mode power supply module of the PMIC to a hardware device positioned on the chip.

FIG. 3 is graph 301A of an unfiltered signal 305A representing current flowing from a switch mode power supply module 108 of the PMIC 107 to a hardware device positioned on the chip 102. The x-axis of the graph 301A represents time while the y-axis of the graph 301A represents current, such current usually being measured in milliamps. The x-axis further includes a threshold current value 310.

This current threshold value 310 may be determined empirically and may be unique to a respective portable computing device 100, based on the size and orientation of the electronic packaging for a particular PCD 100. The threshold value 310 may also be unique to each hardware device. For example, the first CPU 110A may have a threshold current value 310 which is different compared to the threshold current value for the first CPU 110B of FIG. 2B. Moreover, based on tests of a particular PCD 100, it may become known that the current threshold value 310 may be associated with a stage in which a particular hardware device generates a significant amount of heat within a PCD 100 due to the draw of an inrush current resulting from a startup function.

Figure 4:
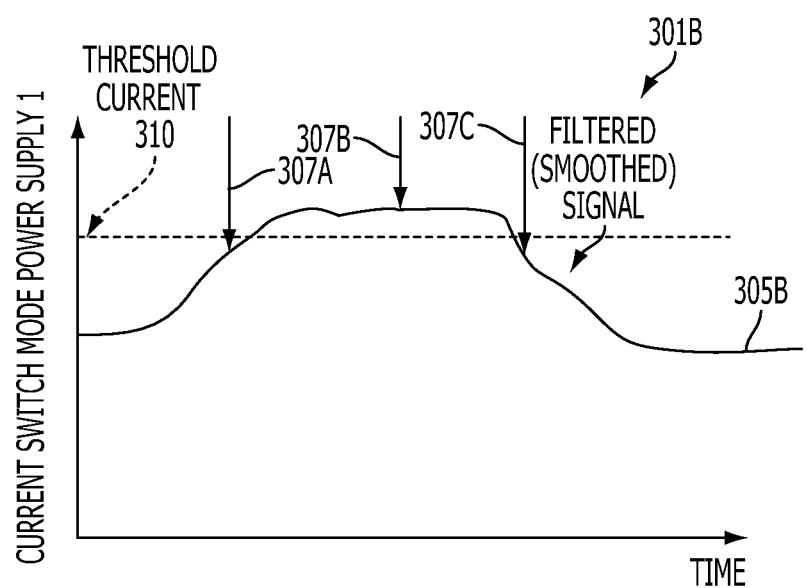
FIG. 4 is graph of a filtered signal derived from the unfiltered signal of FIG. 3.

FIG. 4 is graph 301B of a filtered signal 305B for a single switch mode power supply module 108 derived from the unfiltered signal 305A of FIG. 3. Arrows 307 of FIGS. 3-4 generally show the relationship between the unfiltered signal 305A and filtered signal 305B. The filtered signal 305B may be the result of one or more filtering techniques that may include averaging the values of the unfiltered signal 305A over time or manipulating unfiltered signal 305A via high pass and/or low pass components. The filtered signal 305B may be produced by one or more filters (not illustrated) that are coupled to a current sensor (not illustrated). The filtered signal 305B demonstrates how noise and/or spikes illustrated in FIG. 3 relative to the threshold current value 310 may be reduced and/or eliminated so that a smoother resultant filtered signal 305B may be used by the thermal policy manager module 101 to trigger the execution of thermal mitigation techniques.

As one example, the threshold current value 310 may be used by the thermal policy manager module 101 in order to identify which hardware devices of the chip 102 may be producing too much heat, based on their present electrical current consumption. To counteract such a heating situation, the thermal policy manager module 101 may activate a thermal mitigation technique in which the thermal policy manager module 101 issues commands to other devices that impact the operation of CPUs 110 which in turn may decrease the output current passed by a respective switch mode power supply module 108. As a result of a selected thermal mitigation technique, current flowing out of a switch mode power 108 may be reduced to a hardware element present on the chip 102 for a predetermined period of time. Other thermal mitigation techniques may also be used by the thermal policy manager module 101 as will be described below in connection with FIGS. 6-7.

Figure 5:
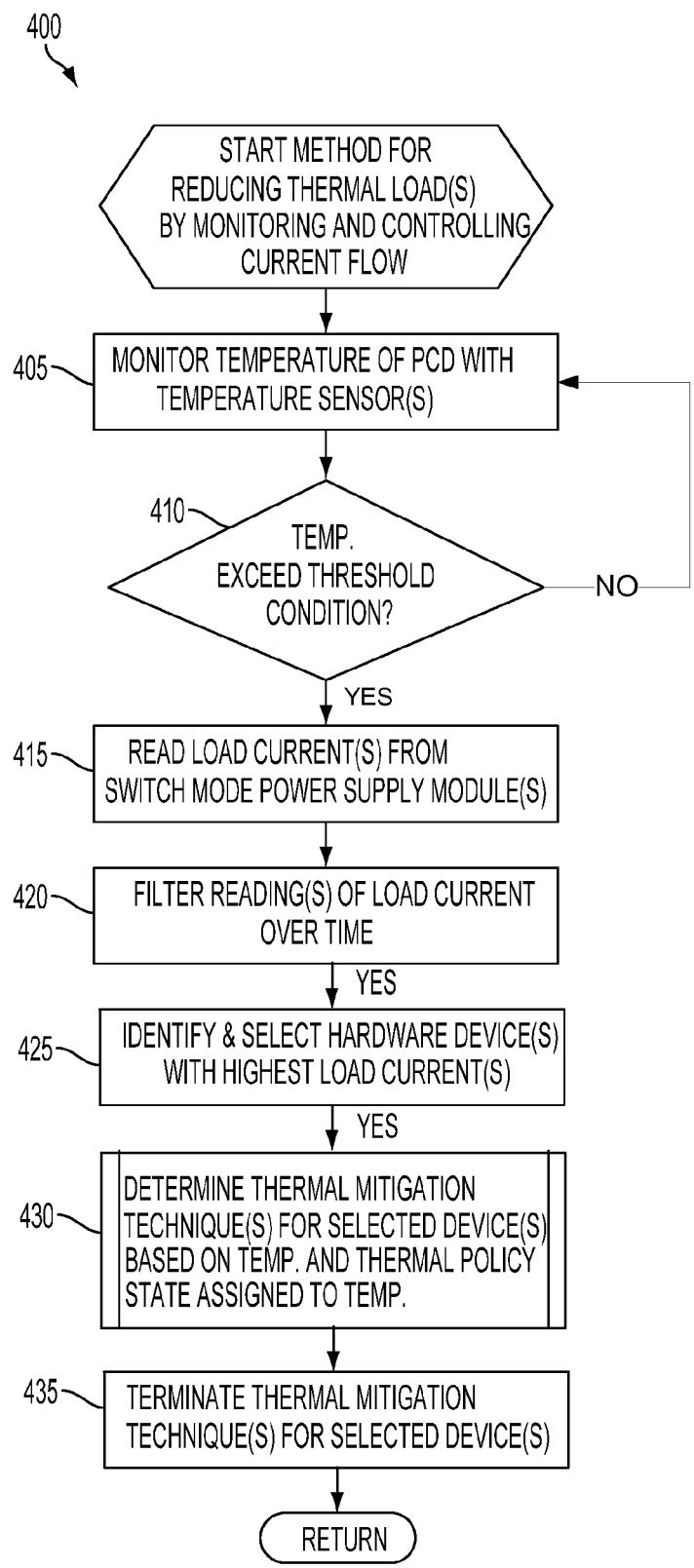
FIG. 5 is a logical flowchart illustrating a method for reducing thermal loads by monitoring and controlling current flow in a PCD.

FIG. 5 is a logical flowchart illustrating a method 400 for reducing thermal loads by monitoring and controlling current flow in a PCD 100. At block 405, the thermal policy manager module 101 may monitor the temperature of the PCD 100 with temperature sensors 157. Particularly, the thermal policy manager module 101 may monitor the temperature near the hardware devices on chip 102 of FIG. 2B with temperature sensors 157A1, 157A2.

Next, in decision block 410, the thermal policy manager module 101 may track threshold temperature values that are assigned to one or more thermal policy states described in further detail in connection with FIGS. 6-7 listed below. If the inquiry to decision block 410 is negative, then the "NO" branch is followed back to block 405. If the inquiry to decision block 410 is positive, then the "YES" branch is followed to block 415. In block 415, the thermal policy manager module 101 may read the load currents exiting each respective switch mode power supply module 108. One exemplary load current 305A is illustrated in FIG. 3 described above. The load current 305A of FIG. 3 comprises an unfiltered signal. The thermal policy manager module 101 may track load currents 305 originating from each switch mode power supply module 108 so that the module 101 may associate the tracked load currents with the thermal loads for each hardware device coupled to a respective switch mode power supply module 108. Notably, in some embodiments, the module 101 may infer the thermal load for a given hardware device from the tracked load current associated with the device while, in other embodiments, module 101 may associate a tracked load current with a simultaneously tracked temperature reading taken from a sensor 157 proximate to a given device.

In block 420, the thermal policy manager module may filter the load current readings of block 415 over time. Optional filters (not illustrated) may be provided for this purpose. One exemplary filtered load current 305B is illustrated in FIG. 4 described above. The filtered load current 305B is usually smoother relative to the unfiltered load current 305A illustrated in FIG. 3 described above. The filtered load current 305B is usually the result of noise being removed as well as spikes being removed from the unfiltered load current 305A. The filtered load current 305B allows the thermal policy manager module 101 to make decisions based on trends rather than instantaneous incremental values which may change abruptly over time.

Next, in block 425, the thermal policy manager module 101 may identify and select one or more hardware devices, such as cores of a multicore CPU 110 and/or CPUs 110 which have current readings exceeding the current threshold value 310 as illustrated in FIG. 4. The hardware devices on chip 102 that exceed the current threshold value 310 for a certain period of time will usually be producing the most thermal energy relative to other hardware devices operating below the current threshold value 310.

Subsequently, in routine or sub-method block 430, the thermal policy manager module 101 may determine which thermal mitigation techniques for the hardware devices selected from block 425 should be activated based on the present temperature that is measured and based on the thermal policy assigned to this temperature. Further details of sub-method block 430 will be described below in connection with FIG. 6. Multiple thermal policies may be assigned to a PCD 100 as will be described in further detail below in connection with FIGS. 6-7. Thermal mitigation techniques which are dependent on policy states are described below in connection with FIGS. 6-7.

After routine block 430, in block 435, the thermal policy manager module 101 may terminate any active thermal mitigation technique(s) for the selected hardware device(s). The method 400 then returns back to block 405 in which the temperature of the PCD 102 is monitored by the thermal policy manager module 101.

Figure 6:
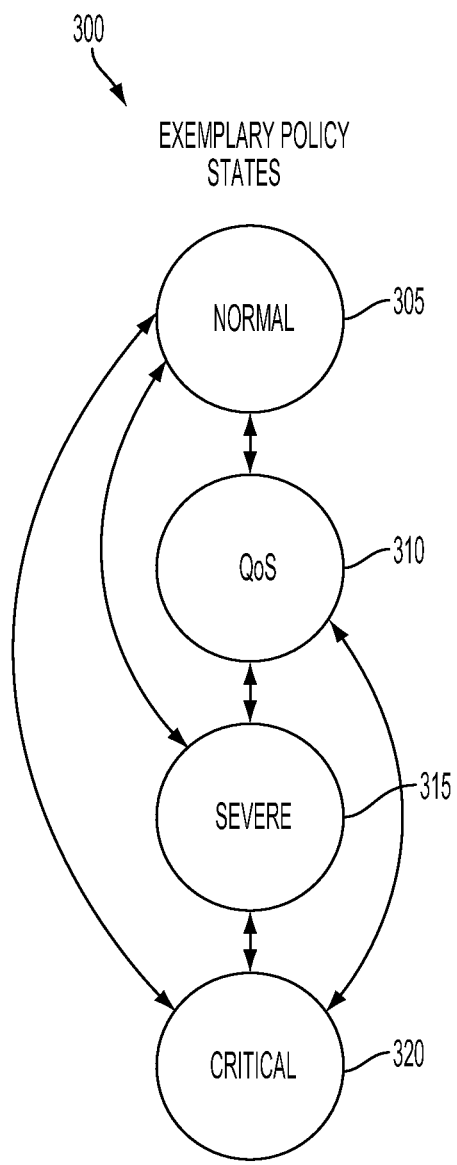
FIG. 6 is an exemplary state diagram that illustrates various thermal policy states that are tracked by the thermal policy manager in the PCD of FIG. 1.

FIG. 6 is an exemplary state diagram 300 that illustrates various thermal policy states 305, 310, 315, and 320 that are tracked by the thermal policy manager module 101. While only four states are illustrated, one of ordinary skill in the art will recognize that other states beyond these four may be created. Similarly, one of ordinary skill in the art recognizes that fewer policies may be employed without departing from the invention. Further, additional sub-states or sub-policies may be added to each state 305, 310, 315, and 320 as understood by one of ordinary skill in the art.

The first policy state 305 may comprise a "normal" thermal state in which the thermal policy manager module 101 only monitors thermal sensors 157 or the current flowing from the switch mode power supply module(s) 108 in a routine or ordinary fashion. In this exemplary first and normal state 305, the PCD 100 is usually not in any danger or risk of experiencing an adverse thermal condition, such as, reaching critical temperatures that may cause failure of any of the hardware and/or software components. In this exemplary state, the thermal sensors 157 may be detecting or tracking temperatures that are at 50° C. or below. However, one of ordinary skill in the art will recognize that other temperature ranges may be established for the first and normal state 305 without departing from the scope of this disclosure.

The second policy state 310 may comprise a "quality of service" or "QoS" state in which the thermal policy manager module 101 may increase the frequency in which thermal sensors 157 and/or switch mode power supply module(s) 108 are polled or in which the thermal sensors 157 send their temperature status reports to the thermal policy manager module 101. Increasing the frequency in which thermal sensors 157 or power supply module(s) 108 are polled or in which the thermal sensors 157 send their temperature status reports helps the thermal policy manager module 101 compensate for situations in which one or more thermal sensors 157 are not in direct contact with a region which is exhibiting high temperatures. The frequency in which temperature readings and current readings are received may be adjusted to compensate for thermal constants of different materials that may exist between a high thermal region and a particular thermal sensor 157.

The exemplary second state 310 may be reached or entered into by the thermal policy manager module 101 when a significant change of temperature has been detected in the first, normal state 305. The threshold or magnitude of the change in temperature (delta T) which triggers this QoS state 310 may be adjusted or tailored according to a particular PCD 100. Therefore, while a PCD 100 may be operating in the first normal state 305, depending upon the magnitude of the change in temperature that is detected by one or more thermal sensors, the PCD 100 may leave the first normal state 305 and enter into the second QoS state 310 as tracked by the thermal policy manager module 101.

For example, a PCD 100 may have a first maximum temperature reading from a given thermal sensor 157 of approximately 40° C. And a second reading from the same thermal sensor 157 may show a change in temperature of only 5° C. which takes the maximum temperature being detected to 45° C. However, while the maximum temperature being detected may be below an established threshold of 50° C. for the first, normal state 305, the change in temperature by 5° C. within a relatively short time frame may be significant enough for the thermal policy manager module 101 to change the state to the second, QoS state 310.

In the second, QoS thermal state 310 the thermal policy manager module 101 may request or it may actually perform one or more thermal mitigation techniques in order to reduce the thermal load and temperature of the PCD 100. In this particular second thermal state 310, the thermal policy manager module 101 is designed to implement or request thermal mitigation techniques that may be barely perceivable by an operator and which may degrade a quality of service provided by the PCD 100 in a minimal fashion. The temperature range for this second, QoS thermal state 310 may comprise a range between about 50° C. to about 80° C.

One of ordinary skill in the art will recognize that other temperature ranges may be established for the second, QoS state 305 and are within the scope of the invention. Further, one of ordinary skill in the art will recognize that other sub-states or sub-policies may be created and used relative to the current set described.

As noted previously, the second, QoS state 310 may be triggered based on the magnitude and/or location of the change in temperature and are not necessarily limited to the endpoints of a selected temperature range. Further details about this second, QoS thermal state 310 will be described below in connection with FIG. 7.

The third thermal state 315 may comprise a "severe" state in which the thermal policy manager module 101 continues to monitor and/or receives interrupts from thermal sensors 157 and switch mode power supply modules 108 while requesting and/or applying more aggressive thermal mitigation techniques relative to the second, QoS state 310 described above. This means that in this state the thermal policy manager module 101 is less concerned about quality of service from the perspective of the operator.

In this third thermal state 315, the thermal policy manager module 101 is more concerned about mitigating or reducing thermal load in order to decrease an overall temperature of the PCD 100. The PCD 100 may have degradations in performance that are readily perceived or observed by an operator in this state 315. The third, severe thermal state 315 and its corresponding thermal mitigation techniques applied or triggered by the thermal policy manager module 101 will be described in further detail below in connection with FIG. 7. The temperature range for this third, severe thermal state 310 may comprise a range between about 80° C. to about 100° C.

Similar to the first thermal state 305 and second thermal state 310 as discussed above, this third and severe thermal state 315 may be initiated based upon the change in temperature detected by one or more thermal sensors 157 and not necessarily limited to a temperature range established or mapped for this third thermal state 315. For example, as the arrows in this diagram illustrate, each thermal state may be initiated in sequence or they can be initiated out of sequence depending upon the magnitude of the change in temperature (delta T) over a certain amount of time that may be detected. So this means that the PCD 100 may leave the first and normal thermal state 305 and enter into or initiate the third and severe thermal state 315 based on a change in temperature that is detected by one or more thermal sensors 157, and vice versa.

Similarly, the PCD 100 may be in the second or QoS thermal state 310 and enter into or initiate the fourth or critical state 320 based on a change in temperature over an amount of time that is detected by one or more thermal sensors 157, and vice versa. In this exemplary third and critical state 320, the thermal policy manager module 101 is applying or triggering as many and as sizable thermal mitigation techniques as possible in order to avoid reaching one or more critical temperatures that may cause permanent damage to the electronics contained within the PCD 100.

This fourth and critical thermal state 320 may be similar to conventional techniques that are designed to eliminate functionality and operation of a PCD 100 in order to avoid critical temperatures. The fourth thermal state 320 may comprise a "critical" state in which the thermal policy manager module 101 applies or triggers the shutting down of non-essential hardware and/or software. The temperature range for this fourth thermal state may include those of about 100° C. and above. The fourth and critical thermal state 320 will be described in further detail below in connection with FIG. 7.

The thermal policy management system is not limited to the four thermal states 305, 310, 315, and 320 illustrated in FIG. 6. Depending upon a particular PCD 100, additional or fewer thermal states may be provided without departing from the scope of the invention. That is, one of ordinary skill in the art recognizes that additional thermal states may improve functionality and operation of a particular PCD 100 while in other situations, fewer thermal states may be preferred for a particular PCD 100 that has its own unique hardware and/or software.

FIG. 7 is a diagram illustrating exemplary thermal mitigation techniques 800 that may be applied or ordered by the thermal policy manager module 101 and are dependent upon a particular thermal state of a PCD 100. As noted previously, the first thermal state 305 may comprise a "normal" state in which the thermal policy manager module 101 being executed by the CPU 110 and partially by the ADC controller 103 may monitor, poll, or receive one or more status reports on temperature from one or more thermal sensors 157 as illustrated in FIG. 2A. In this first thermal state 305, a PCD 100 may not be in any danger or risk of reaching a critical temperature that may harm one or more software and/or hardware components within the PCD 100.

Usually, in this first thermal state 305, the thermal policy manager module 101 is not applying or has not requested any initiation of thermal mitigation techniques such that the PCD 100 is operating at its fullest potential and highest performance without regard to thermal loading. The temperature range for this first thermal state 305 may include those of 50° C. and below. For this first thermal state 305, the thermal policy manager module 101 may reside in the ADC controller 103 while the main thermal policy manager module 101 for all other states may reside or be executed by the CPU 110. In an alternate exemplary embodiment, the thermal policy manager module 101 may reside only in the CPU 110.

In the second thermal state 310 also referred to as the QoS state 310, once it is initiated, the thermal policy manager module 101 may begin more rapid monitoring, polling, and/or receiving of interrupts (relative to the first thermal state 305) from thermal sensors 157 regarding current temperature of the PCD 100 as well as from switch mode power supply module(s) 108 regarding electrical current readings. In this exemplary second thermal state 310, the thermal policy manager module 101 may initiate or request the monitor module 114 and/or operating system ("O/S") module 207 of FIG. 2A to start applying thermal mitigation techniques but with the objective to maintain high-performance with little or no degradations to the quality of service as perceived by the operator of the PCD 100.

According to this exemplary second thermal state 310 illustrated in FIG. 7, the thermal policy manager module 101 may request the monitor 114 and/or the O/S module 207 to initiate thermal mitigation techniques such as, but not limited to, (1) load scaling and/or (2) load dynamic scaling; and (3) spatial load shifting. Load scaling may comprise adjusting or "scaling" the maximum clock frequency allowed in a dynamic voltage and frequency scaling ("DVFS") algorithm. DVFS algorithms are described in detail below in connection with FIG. 10. Such an adjustment may limit the maximum heat dissipation. This thermal load mitigation technique may also involve adjusting the voltage to match a standard DVFS table used for a particular and unique PCD 100. DVFS tables may be derived empirically and in a testing lab prior to public release of a PCD 100.

The thermal load mitigation technique of load dynamic scaling may comprise the scaling of one or all of the N application processor cores 222, 224, and 230. This thermal load mitigation technique may comprise establishing the max clock frequency allowed for the DVFS algorithm of a particular core 222, 224, or 230. The DVFS algorithm will use a table of voltage/frequency pairs to scale processing capability.

One such dynamic scaling technique includes limiting the number of millions of instructions per second (MIPS) by limiting the max frequency allowed. In this way, the thermal policy manager module 101 is effectively limiting the power consumption of the core(s) 222, 224, and 230 and limiting their capability (MIPS) that is available. The thermal policy manager module 101 may choose to limit N cores 222, 224, 230 together, or it can select and chose which cores 222, 224, 230 get scaled back while allowing other cores 222, 224, 230 to operate in an unconstrained manner. The thermal policy manager module 101, monitor module 114, and/or O/S module 207 may make their decisions on which cores 222, 224, 230 to control based on data received from thermal sensors 157 or software application requirements based, and/or best effort prediction.

The thermal load mitigation technique of spatial load shifting comprises the activation and deactivation of cores within a multicore processor system. If N multiple cores exist, each core may be loaded up with work or its performance maximized using up to N-1 cores and then as a thermal sensor 157 indicates a heating problem, the location of an inactive core functioning as a cooling device may be shifted. Each core may effectively be cooled by letting it idle in a predetermined pattern or in a pattern dictated by thermal measurements. A MIPS hole is effectively moved around the cores in the course of several seconds to cool them. In this way, several GHz of processing power may be made available to a PCD 100, while still cooling the silicon die by moving the load around.

The temperature range for this second thermal state may include those of about 50° C. to about 80° C. However, other temperature ranges for this second thermal state may be determined and used for a particular PCD 100 having a unique thermal imprint.

Referring now to the third thermal state 315 of FIG. 7, also known as the severe thermal state 315, the thermal policy manager module 101 may start continuous monitoring, polling, or receiving interrupts from thermal sensors 157 so that temperature and/or current readings from switch mode power supply module(s) 108 are sensed more continuously/frequently compared to the second lower thermal state 310. In this exemplary thermal state 315, the thermal policy manager module 101 may apply or request that the monitor module 114 and/or O/S module 207 more aggressive thermal mitigation techniques and/or additional thermal mitigation techniques (relative to the second thermal state 310) with probable perceivable degradation of performance observed by an operator of the PCD 100.

According to this exemplary third thermal state 315, the thermal policy manager module 101 may cause reduction in power to one or more hardware devices like amplifiers, processors, advanced receiver hardware, etc. For example, one thermal mitigation technique at this third thermal state 315 may include limiting a duration in which a particular hardware device may consume or use electrical current. Such a thermal mitigation technique is described below in connection with FIG. 11.

The thermal policy manager module 101 may also shift workloads among different hardware devices in a spatial manner in order to bring active devices off-line and to bring in active devices on-line. The thermal mitigation techniques of this third and severe thermal state 315 may be the same as those described above with respect to the second, quality of service thermal state 310. However, these same thermal mitigation techniques may be applied in a more aggressive manner.

For example, when adjusting DVFS parameters, the thermal policy manager module 101 may request that these parameters are adjusted more significantly such as providing for significantly lower voltages and/or frequencies compared to the second thermal state 310. These lower voltages and/or frequencies may be lower than is recommended for supporting a particular application program which may degrade performance.

Referring now to the fourth and critical state 320 of FIG. 7, the thermal policy manager module 101 may start shutting down or requesting the monitor 114 and/or O/S module 207 to start shutting down all nonessential hardware and/or software modules.

"Nonessential" hardware and/or software modules may be different for each type of particular PCD 100. According to one exemplary embodiment, all nonessential hardware and/or software modules may include all of those outside of an emergency 911 telephone call function and global positioning satellite ("GPS") functions.

This means that the thermal policy manager module 101 in this fourth, critical thermal state 320 may cause the shutdown of hardware and/or software modules that are outside of emergency 911 telephone calls and GPS functions. The thermal policy manager module 101 may shut down modules in sequence and/or in parallel depending upon the critical temperatures being monitored by the thermal sensors 157, locations of the thermal sensors 157, and the change in temperature being observed by the thermal policy manager module 101. The temperature range for this fourth thermal state 320 may include those of about 100° C. and above.

Figure 8:
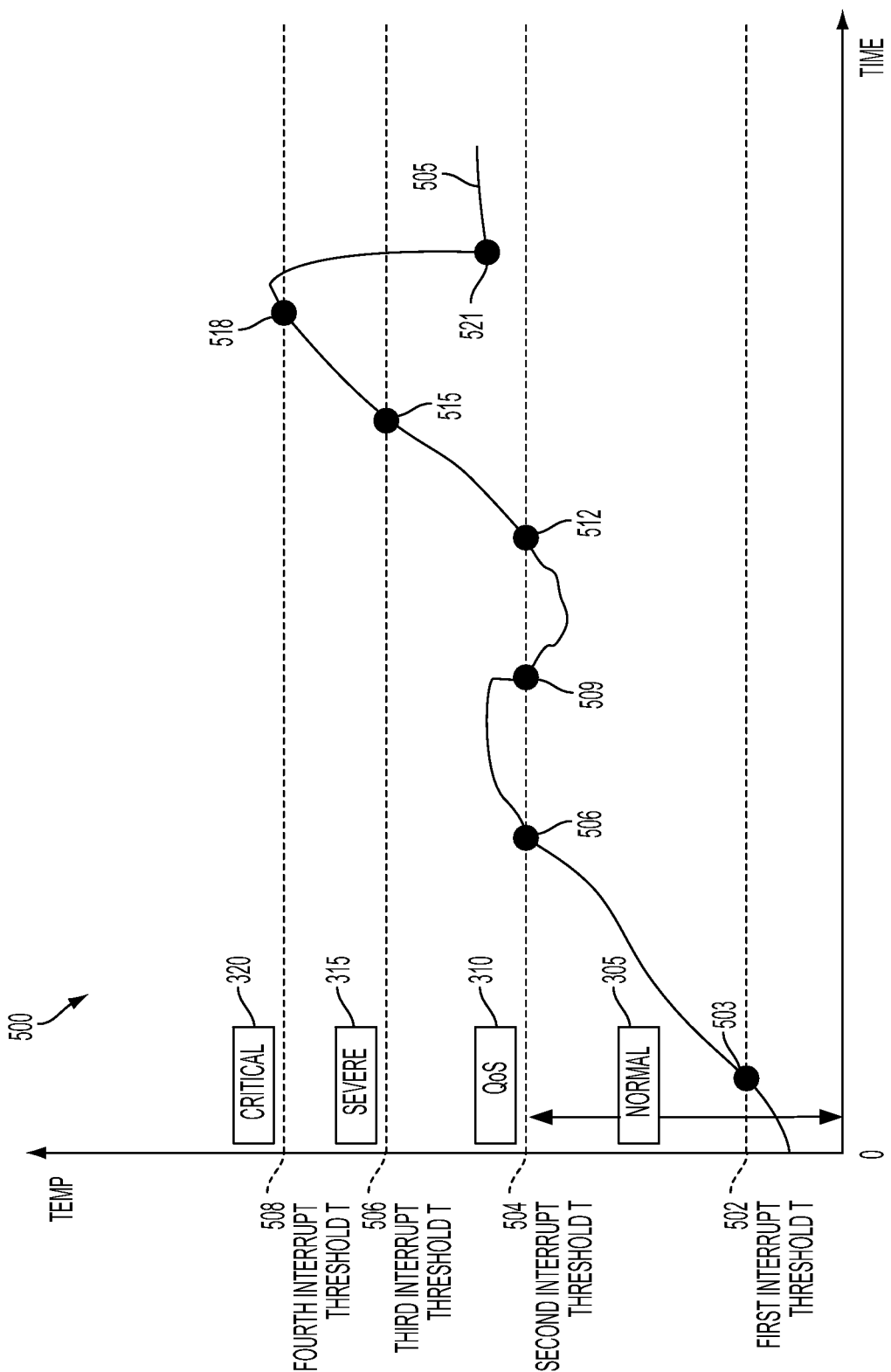
FIG. 8 is a diagram illustrating an exemplary graph of temperature versus time and corresponding thermal policy states.

FIG. 8 is a diagram illustrating an exemplary graph 500 of temperature versus time and corresponding thermal policy states 305, 310, 315, and 320. At the first point 503 of the temperature plot or line 505, the thermal policy manager module 101 may receive a first interrupt temperature reading of 40° C. from one or more thermal sensors 157. Since this first temperature reading of 40° C. may be below the maximum temperature of 50° C. set for the normal thermal state 305, then the thermal policy manager module 101 may remain in the first or normal thermal state 305.

At a second point 506 along the temperature line 505, the thermal policy manager module 101 may receive a second interrupt temperature reading of 50° C. While 50° C. may be within the selected temperature range for the first thermal state 305, if the change in temperature from the last temperature reading was significant, such as a large temperature change within a short period of time (like a 3° C. change within five seconds), then such a change or jump in temperature may trigger the thermal policy manager module 101 to leave the normal thermal state 305 and initiate the second, QoS thermal state 310.

Between the second point 506 and third point 509 of the temperature line 505, the temperature of the PCD 100 was above 50° C. and the thermal policy manager module 101 may have requested or activated one or more thermal mitigation techniques in order to lower the temperature of the PCD 100. At the third point 509 of the temperature line 505, the thermal policy manager module 101 may change the thermal state of the PCD 100 from the second state 3102 the first and normal state 305.

At the fourth point 512, the thermal policy manager module 101 may observe that the temperature trend is moving in an upward fashion or, in other words, the temperature line 505 may have a positive slope or change in delta T. The thermal policy manager module 101 may change the thermal state of the PCD 100 in view of this data from the first thermal state 305 to the second, QoS thermal state 310. In the second thermal state 310, the thermal policy manager module 101 may request or it may activate one or more thermal mitigation techniques that should not significantly impact the quality of service provided by the PCD 100. The second thermal state 310 may include a temperature range between a temperature of about 50° C. to about 80° C.

Moving along the temperature line 505 to the fifth point 515 which has a magnitude of about 80° C., the thermal policy manager module 101 may initiate a change of thermal state from the second, QoS thermal state 310 to the third and severe thermal state 315. As noted previously, the temperature range for this first thermal state may include a range between about 80° C. to about 100° C. In this third and severe thermal state 310, the thermal policy manager module 101 may be requesting or activating a plurality of thermal mitigation techniques that may impact the quality of service and performance of the PCD 100.

The segment of the temperature line 505 between the fifth point 515 and sixth point 518 reflects that the third and severe thermal state 310 has been unsuccessful in mitigating the temperature rise within the PCD 100. Therefore, at the sixth point 518 which may have a magnitude of approximately 100° C., the thermal policy manager module 101 may enter into the fourth and critical state 320. In this fourth and critical state 320, the thermal policy manager module 101 may activate or request that certain hardware and/or software components be shut down in order to alleviate the current thermal load. As noted previously, the thermal policy manager module 101 may cause any hardware and/or software component outside of emergency 911 call functions and GPS functions to be shut down while in this fourth thermal state 320.

Moving along the temperature line 505 to the seventh point 521, the segment of the line 505 between the sixth point 518 and seventh point 521 reflects that the critical thermal state 320 and severe thermal state 315 were successful in lowering the temperature of the PCD 100. As noted previously, one or more thermal states may be jumped or skipped depending upon the temperature measured by the thermal sensors 157 and observed by the thermal policy manager module 101. Further, when returning to lower thermal states, the thermal states followed by the thermal policy manager module 101 may be similar to a hysteresis.

Figure 9A:
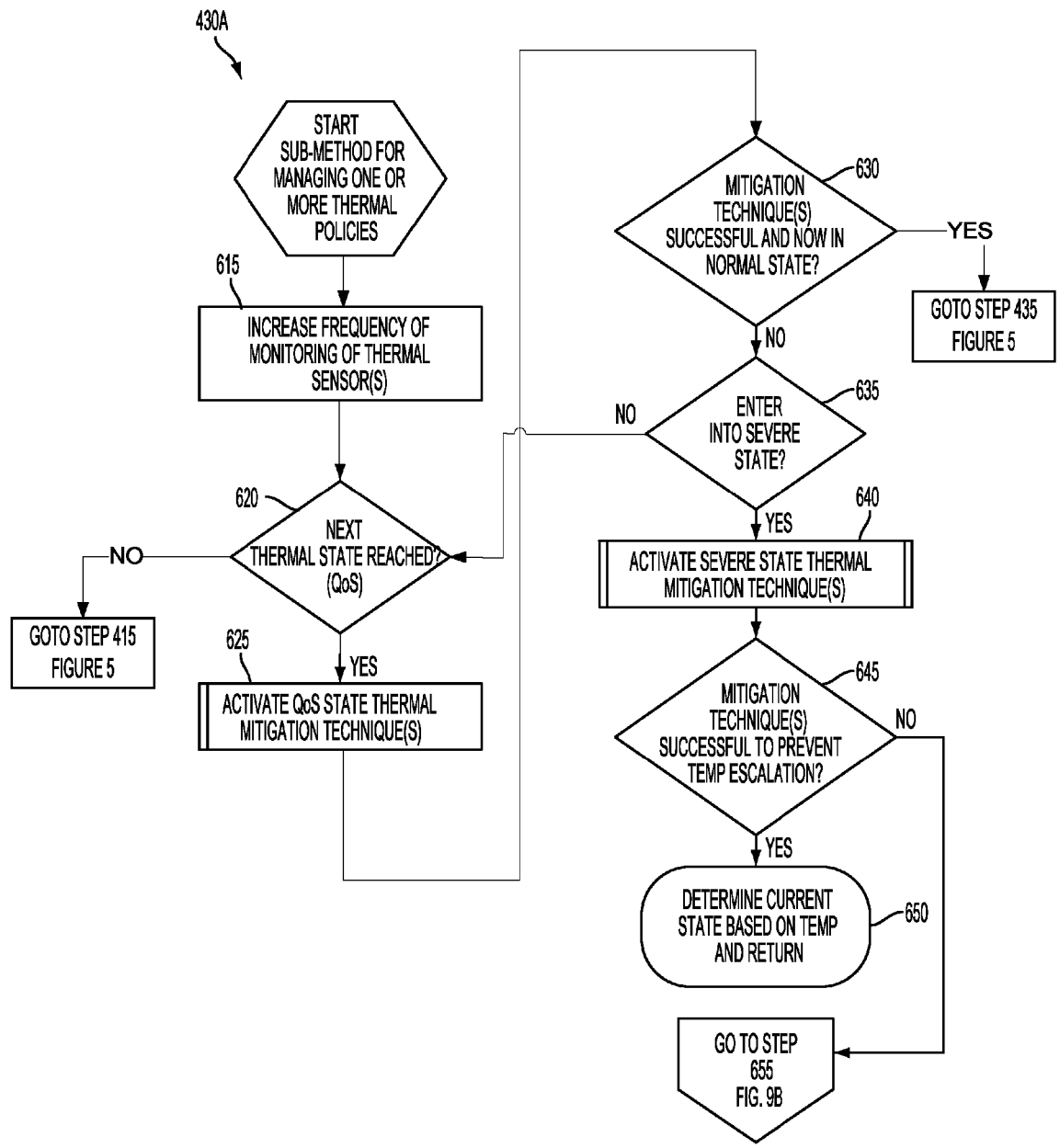
FIGS. 9A-9B are logical flowcharts illustrating a sub-method or subroutine for applying various thermal mitigation techniques.
Figure 9B:
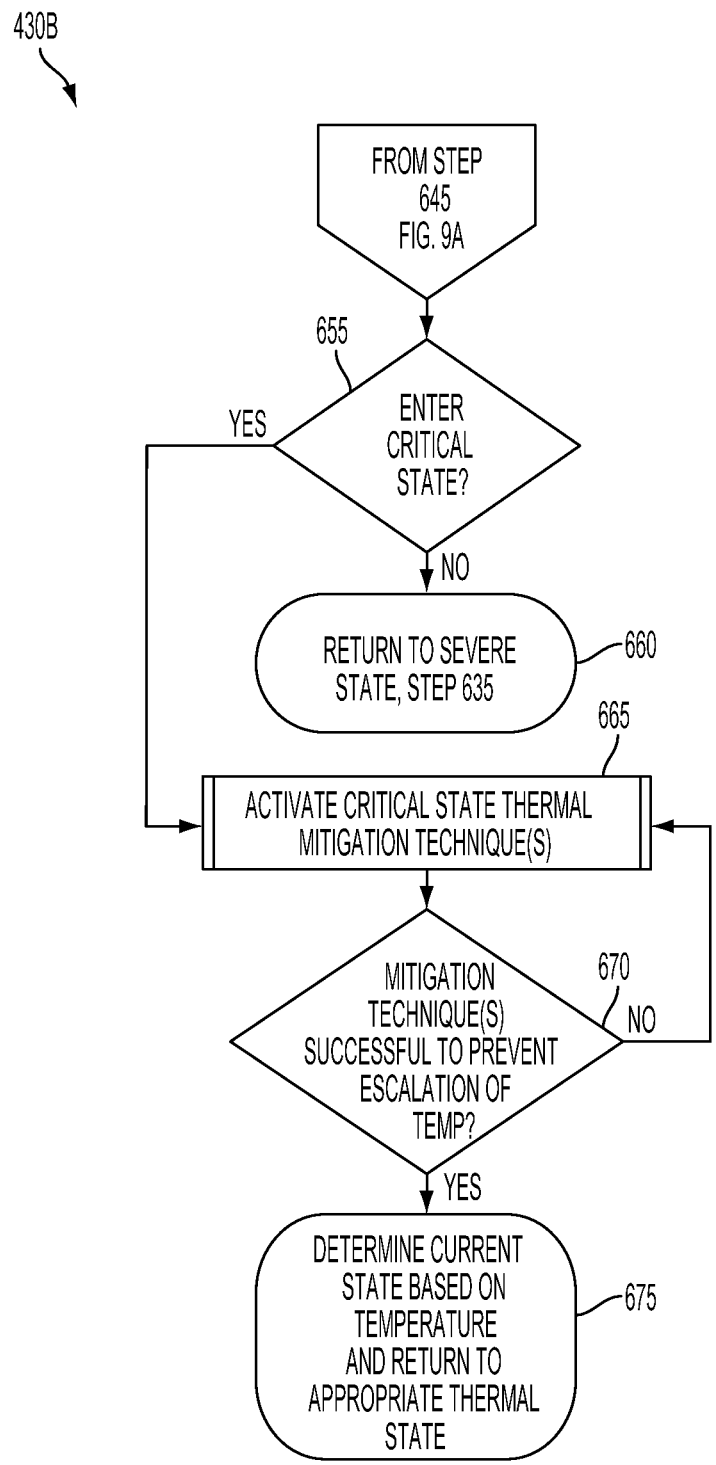

FIGS. 9A-9B are logical flowcharts illustrating a sub-method 430 for determining thermal mitigation technique(s) based on current temperature of a PCD 100. It is noted that while sub-method or routine 430 is illustrated to occur after block 425 of FIG. 5, the main method 400 of FIG. 5 may continue to run or execute in parallel relative to sub-method 430 of FIGS. 9A-9B. That is, the electrical current readings described in method 400 of FIG. 5 may continue to be taken while this sub-method 430 is being executed.

Method 430A of FIG. 9A starts with first block 615 in which the thermal policy manager module 101 may increase the frequency of the monitoring of the thermal sensors 157 and the electrical current readings for the switch mode power supply module(s) 108. In block 615, the thermal policy manager module 101 may actively poll the thermal sensors 157 more frequently or it may request the thermal sensors 157 to send more frequent interrupts that provide temperature data. The thermal policy manager module 101 may also poll the switch mode power supply module(s) 108 more frequently for electrical current readings. This increased monitoring of thermal sensors 157 and switch mode power supply module(s) 108 may occur in the first or normal state 305 and it may also occur in the second or quality of service thermal state 310.

Alternatively, block 615 may be moved altogether to after block 620. In this way, the increase thermal monitoring of sensors 157 would occur only if the next thermal state, the QoS state, has been reached. As will be described below, the methods described in this disclosure are not limited to the specific sequence of each of the embodiments as understood by one of ordinary skill in the art.

Next, in decision block 620, the thermal policy manager module 101 may determine if the next thermal state has been reached or achieved by the PCD 100. In this decision block 620, the thermal policy manager module 101 may be determining if the temperature range assigned to the second thermal state 310 has been achieved. Alternatively, the thermal policy manager in this decision block 620 may be determining if a significant change in temperature (delta T) over time has occurred since a last reading.

If the inquiry to decision block 620 is negative, then the "NO" branch is followed back to block 405 of FIG. 5. If the inquiry to decision block 620 is positive, then the "YES" branch is followed to routine or submethod 625. Routine or submethod 625 may comprise a second thermal state 310 also referred to as the QoS state 310 in which thermal policy manager module 101 may apply or request one or more thermal mitigation techniques described above in connection with FIG. 7. For example, the thermal policy manager module 101 may request the monitor 114 and/or the O/S module 207 to initiate thermal mitigation techniques such as, but not limited to, (1) load scaling and/or (2) load dynamic scaling as described above. According to this routine or submethod 625, those hardware devices identified in block 425 of FIG. 5 as having the highest current loads would be selected first with respect to any thermal mitigation technique(s) initiated at this QoS state 310.

Subsequently, in decision block 630, the thermal policy manager module 101 may determine if the one or more thermal mitigation techniques of the second or QoS state 310 were successful and if the current temperature as detected by the one or more thermal sensors 157 falls within the next lower thermal range for the first or normal state 305. If the inquiry to decision block 630 is positive, then the "YES" branch is followed back to block 435 of FIG. 5. If the inquiry to decision block 630 is negative, then the "NO" branch is followed to decision block 635.

In decision block 635, the thermal policy manager module 101 may determine if the PCD 100 has now entered into the third or severe thermal state 315 according to the temperature as detected by the one or more thermal sensors 157. Alternatively, the thermal policy manager module 101 may determine if the PCD 100 has entered into the third or severe thermal state 315 by determining if a significant change in temperature (delta T) has occurred.

If the inquiry to decision block 635 is negative, then the "NO" branch is followed back to block 620. If the inquiry to decision block 635 is positive, then the "YES" branch is followed to submethod or subroutine 640.

In submethod or subroutine 640, the thermal policy manager module 101 has determined that the PCD 100 has entered into the third or severe thermal state. The thermal policy manager module 101 may then activate or request that one or more thermal mitigation techniques be applied. As noted previously, the thermal policy manager module 101 in this third or severe thermal state 315 may start continuous monitoring, polling, or receiving interrupts from thermal sensors 157 as well as the switch mode power supply modules 108 so that temperature and electrical current readings are sensed more continuously/frequently compared to the second lower thermal state 310.

In this exemplary third thermal state 315, the thermal policy manager module 101 may apply or request that the monitor module 114 and/or O/S module 207 apply more aggressive thermal mitigation techniques and/or additional thermal mitigation techniques (relative to the second thermal state 310) with probable perceivable degradation of performance observed by an operator of the PCD 100. According to this exemplary thermal state 315, the thermal policy manager module 101 may cause reduction in power to one or more hardware devices like amplifiers, processors, advanced receiver hardware, etc. that were identified in block 425 of FIG. 5 based on their electrical current readings. The reduction in power to these hardware devices may be governed by the current-timing thermal mitigation technique illustrated in FIG. 10 described below.

The thermal policy manager module 101 may also shift workloads among different hardware devices identified in block 425 of FIG. 5 in a spatial manner in order to bring active devices off-line and to bring in active devices on-line. The thermal mitigation techniques of this third and severe thermal state 315 may be the same as those described above with respect to the second, quality of service thermal state 310. However, these same thermal mitigation techniques may be applied in a more aggressive manner. As another example, when adjusting DVFS parameters, the thermal policy manager module 101 may request that these parameters are adjusted more significantly such as providing for significantly lower voltages and/or frequencies compared to the second thermal state 310. These lower voltages and/or frequencies may be lower than is recommended for supporting a particular application program.

Next, in decision block 645, the thermal policy manager module 101 may determine if the one or more thermal mitigation techniques applied in submethod or routine 640 were successful to prevent escalation of temperature for the PCD 100. If the inquiry to decision block 645 is negative, then the "NO" branch is followed to step 655 of FIG. 6B. If the inquiry to decision block 645 is positive, then the "YES" branch is followed to step 650 in which the thermal policy manager module 101 determines the current thermal state of the PCD 100 based on temperature readings provided by the one or more thermal sensors 157. Depending the temperature reading in block 650, the sub-method 430 may proceed to either block 625 of FIG. 9A or block 435 of FIG. 5.

Referring now to FIG. 9B, this figure is a continuation flow chart relative to the flowchart illustrated in FIG. 9A. The method 430B of FIG. 9B starts with decision block 655 in which the thermal policy manager module 101 may determine if the PCD 100 has entered into the fourth or critical thermal state 320 based on the temperature being detected by one or more thermal sensors 157.

If the inquiry to decision block 655 is negative, then the "NO" branch is followed to step 660 in which the thermal policy manager module 101 returns the PCD 100 to the third or severe thermal state 315 and the process returns to block 635 of FIG. 6A. Alternatively, if the temperature has dropped by two levels or three levels, the method may proceed back to either block 625 of FIG. 9A or block 435 of FIG. 5.

If the inquiry to decision block 655 is positive, then the "YES" branch is followed to submethod or routine 665 in which the thermal policy manager module 101 activates or request that one or more critical thermal mitigation techniques be activated. The thermal policy manager module 101 in this fourth, critical thermal state 320 may cause the complete shutdown of hardware and/or software modules that are outside of emergency 911 telephone calls and GPS functions. The thermal policy manager module 101 may start the shutdown of hardware devices in a priority based on the hardware devices identified in block 425 of FIG. 5 having the highest current readings. The thermal policy manager module 101 may shut down modules in sequence and/or in parallel depending upon the critical temperatures being monitored by the thermal sensors 157, the current readings from the switch mode power supply module(s) 108, and the change in temperature being observed by the thermal policy manager module 101.

Subsequently, in decision block 670, the thermal policy manager module 101 may determine if the thermal mitigation techniques applied in routine or submethod 665 were successful to prevent any escalation of temperature of the PCD 100 as detected by the thermal sensors 157. If the inquiry to decision block 670 is negative, then the "NO" branch is followed back to routine or submethod 665.

If the inquiry to decision block 670 is positive, then the "YES" branch is followed to step 675 in which the thermal policy manager module 101 determines the current thermal state of the PCD 100 based on temperature readings supplied by one or more thermal sensors 157. Once the temperature readings are assessed by the thermal policy manager module 101, the thermal policy manager module 101 initiates (or returns to) the thermal state corresponding to the temperature ranges detected by the thermal sensors 157. This means that the sub-method 430 may proceed to block 435 of FIG. 5, block 625 of FIG. 9A, or block 640 of FIG. 9A.

Figure 10:
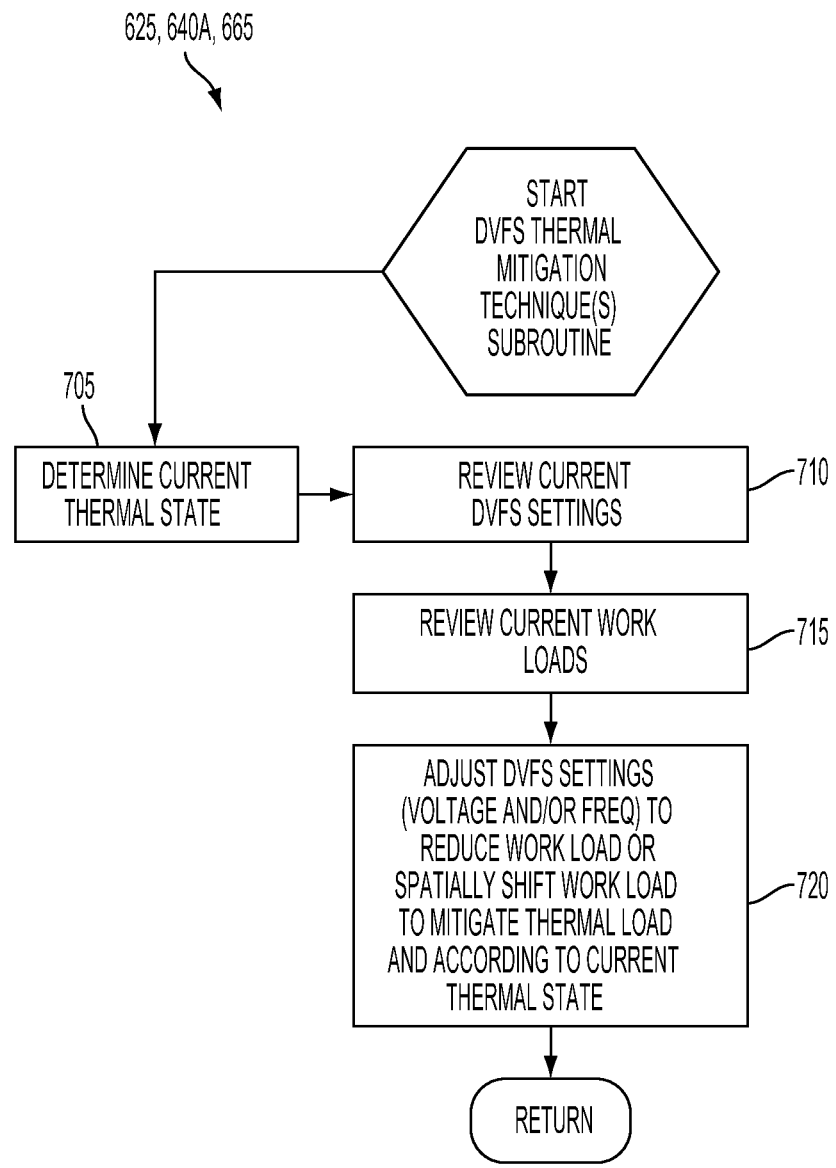
FIG. 10 is a logical flowchart illustrating sub-method or subroutines for applying dynamic voltage and frequency scaling ("DVFS") thermal mitigation techniques.

FIG. 10 is a logical flowchart illustrating sub-method or subroutines 625, 640A, and 665 for applying dynamic voltage and frequency scaling ("DVFS") thermal mitigation techniques. DVFS algorithms may form or be part of at least one thermal mitigation technique that may be triggered by the thermal policy manager module 101 when certain thermal conditions are met as described above.

As understood by one of ordinary skill in the art, the demand for processors that provide high performance and low power consumption has led to the use of various power management techniques, such as, dynamic voltage and frequency scaling ("DVFS") in processor designs. DVFS enables trade-offs between power consumption and performance. Processors 110 and 126 (FIGS. 1, 2A-2B) may be designed to take advantage of DVFS by allowing the clock frequency of each processor to be adjusted with a corresponding adjustment in voltage.

A reduction in operating voltage usually results in a proportional savings in power consumed. One main issue for DVFS enabled processors 110, 126 is how to control the balance between performance and power savings.

Block 705 is the first step in the submethod or subroutine for applying DVFS thermal mitigation techniques. In this first block 705, the thermal policy manager module 101 may determine the current thermal state based on temperature readings provided by thermal sensors 157. Once the current thermal state is determined by the thermal policy manager module 101, the thermal policy manager module 101 may then review the current DVFS settings in block 710. Next, in block 715, the thermal policy manager module 101 may review the current workloads of one or more hardware and/or software modules.

Next, in block 720, the thermal policy manager module 101 may adjust or issue commands to adjust the current DVFS settings that may include voltage and/or frequency, in order to reduce workload or to spatially shift the workload to mitigate thermal loading conditions and according to the current thermal state which was determined by the thermal policy manager module 101.

So for the second or QoS thermal state 310, in block 720, the thermal policy manager module 101 may initiate or request the monitor module 114 and/or operating system ("O/S") module 207 of FIG. 2A to start applying thermal mitigation techniques but with the objective to maintain high-performance with little or no perception in degradations to the quality of service as perceived by the operator of the PCD 100.

According to this exemplary second thermal state 310 illustrated in FIG. 7, the thermal policy manager module 101 may request the monitor 114 and/or the O/S module 207 to initiate thermal mitigation techniques such as, but not limited to, (1) load scaling and/or (2) load dynamic scaling. Load scaling may comprise adjusting or "scaling" the maximum clock frequency allowed in DVFS algorithm.

For the third or severe terminal state 315, in block 720, the thermal policy manager module 101 may start continuous monitoring, polling, or receiving interrupts from thermal sensors 157 and current readings from switch mode power supply modules 108 so that current and temperature are sensed more continuously/frequently compared to the second lower thermal state 310. In this exemplary third thermal state 315, the thermal policy manager module 101 may apply or request that the monitor module 114 and/or O/S module 207 more aggressive thermal mitigation techniques and/or additional thermal mitigation techniques (relative to the second thermal state 310) with probable perceivable degradation of performance observed by an operator of the PCD 100, such as the current-timing technique illustrated in FIG. 11 described below. According to the exemplary third thermal state 315, the thermal policy manager module 101 may cause reduction in power to one or more hardware devices like amplifiers, processors, advanced receiver hardware, etc.

The thermal policy manager module 101 may also shift workloads among different hardware devices in a spatial manner in order to bring active devices off-line and to bring in active devices on-line. The thermal mitigation techniques of this third and severe thermal state 315 may be the same as those described above with respect to the second, quality of service thermal state 310. However, these same thermal mitigation techniques may be applied in a more aggressive manner. For example, when adjusting DVFS parameters, the thermal policy manager module 101 may request that these parameters are adjusted more significantly such as providing for significantly lower voltages and/or frequencies compared to the second thermal state 310. These lower voltages and/or frequencies may be lower than is recommended for supporting a particular application program.

For the fourth or critical terminal state 320, in block 720, this thermal state 320 may be similar to conventional techniques that are designed to eliminate functionality and operation of a PCD 100 in order to avoid critical temperatures. The fourth thermal state 320 may comprise a "critical" state in which the thermal policy manager module 101 applies or triggers the shutting down of non-essential hardware and/or software. The temperature range for this fourth thermal state may include those of about 100° C. and above. The sub-method 625, 640, or 665 then returns to an appropriate step in the thermal management method 600 depending upon the current thermal state of the PCD 100.

Figure 11:
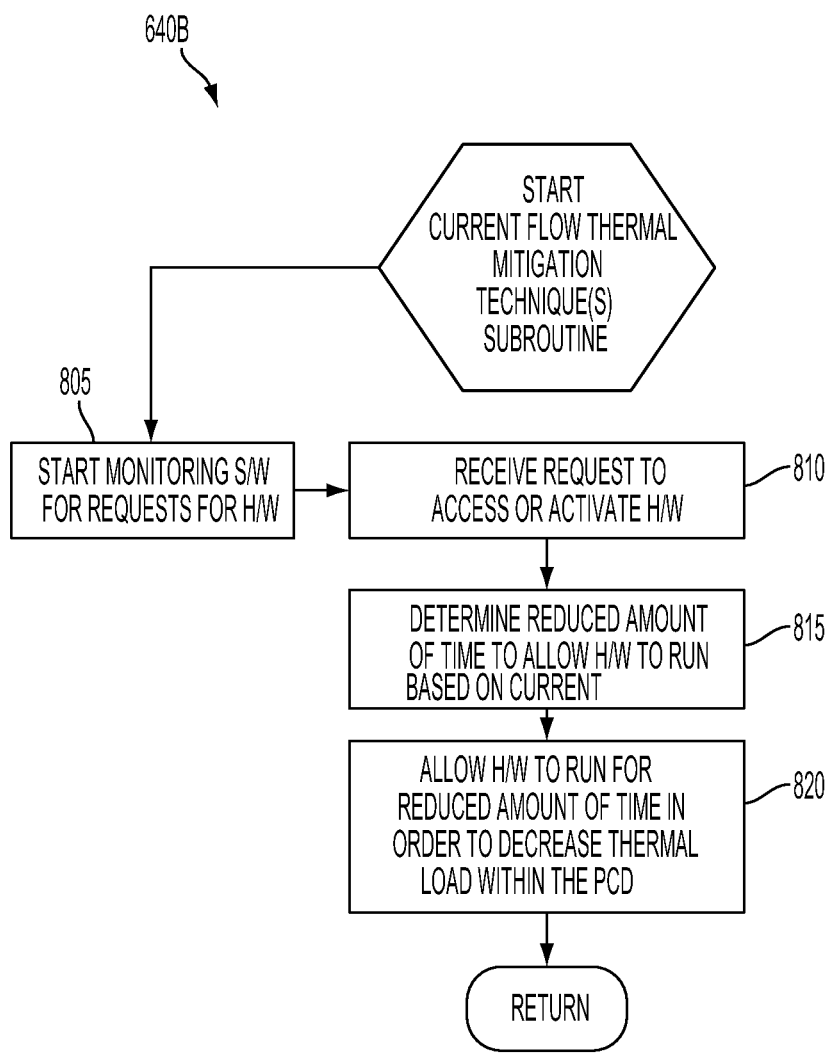
FIG. 11 is a logical flowchart illustrating a method for reducing thermal loads by controlling current flow for predetermined periods of time in a PCD.

FIG. 11 is a logical flowchart illustrating another exemplary sub-method 640B for reducing thermal loads by reducing current flow to hardware devices in a PCD 100 for predetermined periods of time. This exemplary sub-method 640B may be available only when the PCD 100 has entered into the third, severe thermal policy state 315 as illustrated in FIG. 7, because of its likely impact on the quality of service and degradation in performance as perceived by the operator of the PCD 100. However, in alternate exemplary embodiments, this sub-method 640B may be available for other thermal policy states such as the QoS thermal policy state 310 and critical thermal policy state 320 as illustrated in FIG. 7.

Block 805 is the first step of sub-method 640B in which the thermal policy manager module 101 may start to monitor requests or tasks from software for activating hardware devices present on chip 102. Next, in block 810, the thermal policy manager module 101 may receive a request from software to run a hardware device in order to support a function or operation. In block 815, the thermal policy manager 101 may determine the amount of run-time and the amount of electrical current that will be required to complete the request made from the software.

Next, in block 820, based on its calculations in block 815, the thermal policy manager may allow the requested hardware device to run for a reduced period of time in order to mitigate the generation of any detrimental thermal load. The sub-method then returns to block 645 of FIG. 9A.

In view of the inventive system and methods described above, an Original Equipment Manufacturer ("OEM") may program the thermal policy manager module 101 to have a set of thermal states 305, 310, 315, and 320, such as those illustrated in FIGS. 6-7, that may comprise different conditions for initiating one or more thermal mitigation techniques for reducing heat produced by the portable computing device 100. An OEM may select a set of thermal mitigation techniques corresponding to each thermal state (305, 310, 315, 320 of FIG. 6) for the thermal policy manager module 101, such as illustrated in FIG. 7.

Each set of thermal mitigation techniques may be unique for a particular thermal state (like 305, 310, 315, and 320 of FIG. 7). The thermal policy manager module 101 may be programmed by the OEM to have thresholds for each thermal mitigation technique, such as illustrated in FIG. 8, in which temperature thresholds are used. Each thermal mitigation technique, such as illustrated in FIG. 7, may comprise a unique power reducing algorithm relative to other existing thermal mitigation techniques.

An OEM may program the thermal policy manager module 101 to have one or more magnitudes for power reductions that are associated with a particular thermal mitigation technique. In other embodiments, an OEM may program the thermal policy manager module 101 to have a plurality of thermal mitigation techniques that sacrifice quality of service of the portable computing device in a series of graduated steps for reducing heat produced by the portable computing device.

An OEM may program the thermal policy manager module 101 to activate thermal mitigation techniques in a sequence based on the functions produced by application programs being executed by the portable computing device 100. For example, each algorithm may be activated based on a specific function or task being executed by an application program running on the portable computing device 100.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" may include any means that may store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

Computer-readable media include both computer storage media and communication media including any medium that facilitates transfer of a computer program from one place to another. A storage media may be any available media that may be accessed by a computer. By way of example, and not limitation, such computer-readable media may comprise any optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for reducing thermal load by monitoring and controlling current flow in a portable computing device, the method comprising:
    monitoring a temperature of the portable computing device;
    determining if the temperature has reached a temperature threshold condition;
    if the temperature has reached the temperature threshold condition, then monitoring electrical current exiting a plurality of power supply devices, each power supply device controlling power to one or more associated hardware devices;
    if the electrical current exiting one of the plurality of power supply devices has exceeded a current threshold condition, then selecting the hardware device corresponding to the electrical current for participating in a thermal mitigation technique.

2. The method of claim 1, further comprising applying a thermal mitigation technique in which current flow to the hardware device has been reduced.

3. The method of claim 1, further comprising applying a thermal mitigation technique in which the current flow to the hardware device is limited according to a time period.

4. The method of claim 1, further comprising applying a DVFS thermal mitigation technique that includes limiting a maximum frequency allowed for the hardware device.

5. The method of claim 4, wherein the DVFS thermal mitigation technique comprises one of limiting a maximum frequency for a plurality of cores in a multicore system and selecting a predetermined number of cores for scaling with a predetermine number of cores which will operate in an unconstrained manner.

6. The method of claim 1, further comprising applying a filtering technique to the monitored electrical current exiting a power supply device.

7. The method of claim 1, further comprising monitoring temperature of the portable computing device with at least one of an internal thermal sensor and an external thermal sensor.

8. The method of claim 7, further comprising determining if a change in temperature has been detected by at least one thermal sensor.

9. The method of claim 8, further comprising if the change in temperature has been detected by a thermal sensor, then increasing a frequency in which temperature readings are detected or in which electrical current exiting a power supply device is monitored.

10. The method of claim 1, wherein the temperature threshold condition comprises a plurality of thermal states and wherein each thermal state comprises a range of temperatures.

11. A computer system for reducing thermal load by monitoring and controlling current flow in a portable computing device, the system comprising:
    a processor operable for:
        monitoring a temperature of the portable computing device;
        determining if the temperature has reached a temperature threshold condition;
        if the temperature has reached the temperature threshold condition, then monitoring electrical current exiting a plurality of power supply devices, each power supply device controlling power to one or more associated hardware devices; and
        selecting the hardware device corresponding to the electrical current for participating in a thermal mitigation technique if the electrical current has exceeded a current threshold condition.

12. The system of claim 11, wherein the processor is further operable for:
    applying a thermal mitigation technique in which current flow to the hardware device has been reduced.

13. The system of claim 11, wherein the processor is further operable for:
    applying a thermal mitigation technique in which the current flow to the hardware device is limited according to a time period.

14. The system of claim 11, wherein the processor operable for:
    applying a DVFS thermal mitigation technique that includes limiting a maximum frequency allowed for the hardware device.

15. The system of claim 14, wherein the DVFS thermal mitigation technique comprises one of limiting a maximum frequency for a plurality of cores in a multicore system and selecting a predetermined number of cores for scaling with a predetermine number of cores which will operate in an unconstrained manner.

16. The system of claim 11, wherein the processor operable for:
    applying a filtering technique to the monitored electrical current exiting a power supply device.

17. The system of claim 11, wherein the processor is further operable for:
    monitoring temperature of the portable computing device with at least one of an internal thermal sensor and an external thermal sensor.

18. The system of claim 17, wherein the processor is further operable for:
    determining if a change in temperature has been detected by at least one thermal sensor.

19. The system of claim 11, wherein the processor is further operable for:
    increasing a frequency in which temperature readings are detected or in which electrical current exiting a power supply device is monitored if the change in temperature has been detected by a thermal sensor.

20. The system of claim 11, wherein the temperature threshold condition comprises a plurality of thermal states and wherein each thermal state comprises a range of temperatures.

21. A computer system for reducing thermal load by monitoring and controlling current flow in a portable computing device comprising:
    means for monitoring a temperature of the portable computing device;
    means for determining if the temperature has reached a temperature threshold condition;

means for monitoring electrical current exiting a plurality of power supply devices if the temperature has reached the temperature threshold condition, each power supply device controlling power to one or more associated hardware devices; and means for selecting the hardware device corresponding to the electrical current for participating in a thermal mitigation technique if the electrical current has exceeded the current threshold condition.

22. The system of claim 21, further comprising:
means for applying a thermal mitigation technique in which current flow to the hardware device has been reduced.

23. The system of claim 21, further comprising:
means for applying a thermal mitigation technique in which the current flow to the hardware device is limited according to a time period.

24. The system of claim 21, further comprising means for applying a DVFS thermal mitigation technique that includes limiting a maximum frequency allowed for the hardware device.

25. The system of claim 24, wherein the DVFS thermal mitigation technique comprises one of limiting a maximum frequency for a plurality of cores in a multicore system and selecting a predetermined number of cores for scaling with a predetermine number of cores which will operate in an unconstrained manner.

26. The method of claim 21, further comprising:
means for applying a filtering technique to the monitored electrical current exiting a power supply device.

27. The system of claim 21, further comprising:
means for monitoring temperature of the portable computing device with at least one of an internal thermal sensor and an external thermal sensor.

28. The system of claim 21, further comprising:
means for determining if a change in temperature has been detected by at least one thermal sensor.

29. The system of claim 28, further comprising:
means for increasing a frequency in which temperature readings are detected or in which electrical current exiting a power supply device is monitored if the change in temperature has been detected by a thermal sensor.

30. The system of claim 21, wherein the temperature threshold condition comprises a plurality of thermal states and wherein each thermal state comprises a range of temperatures.

31. A computer program product comprising a non-transitory computer usable medium having a computer readable program code embodied therein, said computer readable program code adapted to be executed to implement a method for reducing thermal load by monitoring and controlling current flow in a portable computing device comprising, said method comprising:
monitoring a temperature of the portable computing device;
determining if the temperature has reached a temperature threshold condition;
if the temperature has reached the temperature threshold condition, then monitoring electrical current exiting a plurality of power supply devices, each power supply device controlling power to one or more associated hardware devices; and
if the electrical current has exceeded the current threshold condition, then selecting the hardware device corresponding to the electrical current for participating in a thermal mitigation technique.

32. The computer program product of claim 31, wherein the program code implementing the method further comprises:
applying a thermal mitigation technique in which current flow to the hardware device has been reduced.

33. The computer program product of claim 31, wherein the program code implementing the method further comprises:
applying a thermal mitigation technique in which the current flow to the hardware device is limited according to a time period.

34. The computer program product of claim 31, wherein the program code implementing the method further comprises:
applying a DVFS thermal mitigation technique that includes limiting a maximum frequency allowed for the hardware device.

35. The computer program product of claim 34, wherein the DVFS thermal mitigation technique comprises one of limiting a maximum frequency for a plurality of cores in a multicore system and selecting a predetermined number of cores for scaling with a predetermine number of cores which will operate in an unconstrained manner.

36. The computer program product of claim 31, wherein the program code implementing the method further comprises:
applying a filtering technique to the monitored electrical current exiting a power supply device.

37. The computer program product of claim 31, wherein the program code implementing the method further comprises:
monitoring temperature of the portable computing device with at least one of an internal thermal sensor and an external thermal sensor.

38. The computer program product of claim 37, wherein the program code implementing the method further comprises:
determining if a change in temperature has been detected by at least one thermal sensor.

39. The computer program product of claim 31, wherein the program code implementing the method further comprises:
increasing a frequency in which temperature readings are detected or in which electrical current exiting a power supply device is monitored if the change in temperature has been detected by a thermal sensor.

40. The computer program product of claim 31, wherein the temperature threshold condition comprises a plurality of thermal states and wherein each thermal state comprises a range of temperatures.

* * * * *